Oct. 6, 1959     J. R. CUNNINGHAM ET AL     2,907,644
CHEMICAL REACTOR
Filed Dec. 6, 1954
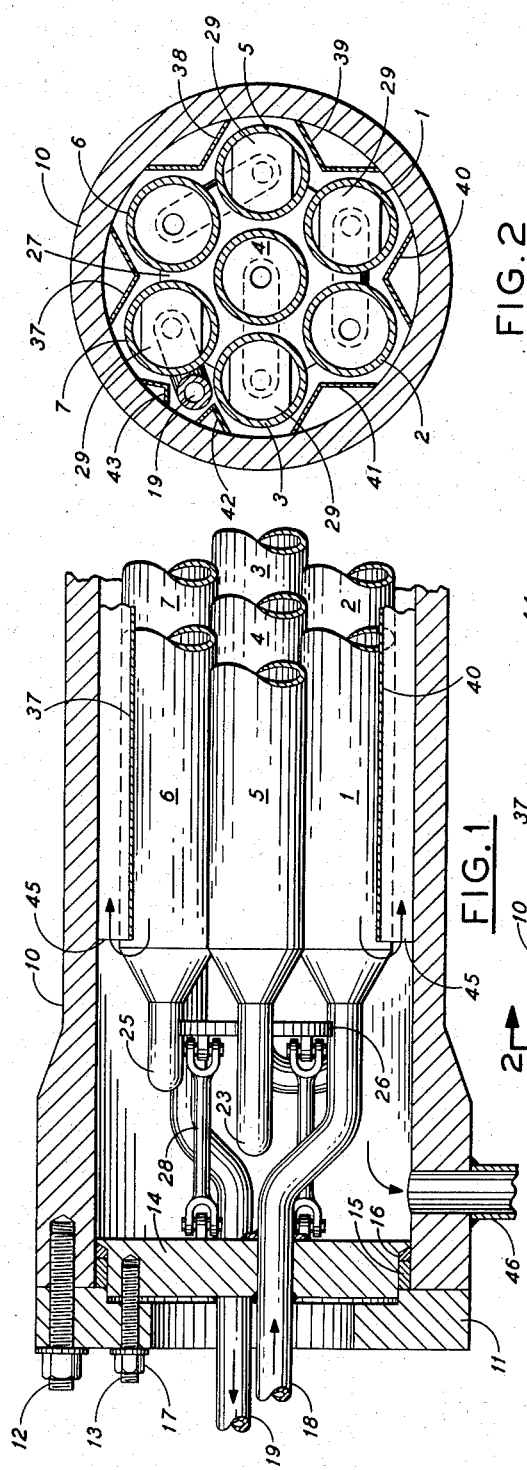
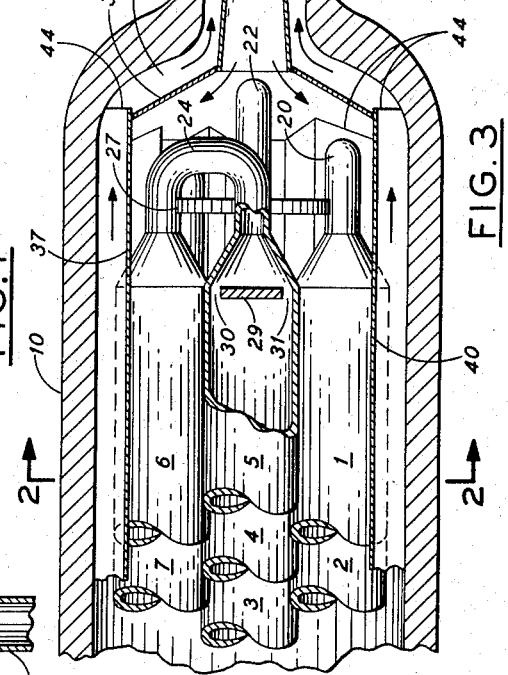
INVENTORS
JOHN R. CUNNINGHAM
MILTON LUDWIG
BY
ATTORNEYS

United States Patent Office 2,907,644
Patented Oct. 6, 1959

2,907,644

CHEMICAL REACTOR

John R. Cunningham, Larkspur, and Milton Ludwig, Berkeley, Calif., assignors to Standard Oil Company of California, San Francisco, Calif., a corporation of Delaware Application December 6, 1954, Serial No. 473,149

2 Claims. (Cl. 23—284)

This invention relates to a chemical reactor providing an elongated confined path for progressively reacting at high temperature and pressure a mixture of fluids, both liquid and gaseous, and of varying densities and degrees of miscibility. Further, it relates to a method and an environment for continuously converting organic materials, and specifically hydrocarbons, under conditions which would seriously corrode the usual materials used to contain such materials.

The process to which the reactor and method is particularly, but not exclusively, adapted is the conversion of organic materials with water soluble sulfates and sulfides at temperatures of 200°–700° F. and at pressures from 200 up to 5000 p.s.i.g., to partially oxidize the organic materials under controlled conditions. For example, a hydrocarbon such as metaxylene reacted with ammonium sulfate and ammonium sulfide solutions in proper proportions produces isophthalic acid, as is set forth in detail in the copending application of W. G. Toland, Jr., Serial No. 371,209, filed July 30, 1953, now Patent 2,722,549, entitled "Oxidation Process" and assigned to the common assignee herewith. During that reaction process, there may be present free ammonia in gaseous form, as well as aqueous solutions of the ammonium sulfate and sulfite, liquid hydrocarbons, isophthalic acid products and liquefied free sulfur, the proper control and containment of which require special reactor materials and control of heat transfer and fluid flow, as will be discussed in detail below.

The exemplary reaction just described is endothermic, and it is one of the objects of this invention to provide an improved reactor of the series tubular heat-exchange type, and with provision for control of the circulation of heating fluid to effect the desired heat transfer and conversion rates.

Another object is to provide a confined zone of extended length so that the reaction will be progressive, i.e., with little or no back-mixing and no large volumes of accumulated intermediate or final fluid products in the system.

Another object is to provide an improved material or environment for the reaction to keep corrosion of the reaction systems at a minimum and to maintain the high-temperature strength of the structure at a maximum value.

Another object is to provide an improved arrangement of a convoluted reaction zone, to maintain fluid flow and heat transfer rates at desirable values and, at the same time, to keep the physical dimensions and particularly the diameter of the enclosing shell at a desirable minimum.

Another object is to provide means for conveying the reaction mixture that will maintain the several fluid components, both gaseous and liquid, in the desired state of subdivision and effective contact.

These and other objects and advantages will be further apparent from the following description, and from the attached drawing, which forms a part of this specification and illustrates a preferred embodiment of this invention, as applied to a hydrocarbon oxidation process.

In the drawing, Figure 1 is a part section longitudinal elevational view of one end of a reactor, showing a preferred arrangement of a containing shell and means forming a convoluted tubular reaction zone therein.

Figure 2 is a transverse vertical sectional view taken on line 2—2 of Figure 1.

Figure 3 is a part sectional longitudinal elevational view of the opposite end of the reactor of Figure 1, illustrating a preferred arrangement for heating fluid circulation and reaction fluid mixing.

Referring to the drawing, and particularly to Figure 1, reference numeral 10 designates a tubular cylindrical shell of carbon steel or other suitable metal provided with a closure structure effective to withstand high pressures, on the order of 200–5000 p.s.i.g. The closure arrangement, in this example, consists of an annular ring member 11, secured by threaded studs 12 to the end of shell 10, and connected by threaded studs 13 to a flat closure disc 14. An annular spacing ring 15 is adapted to compress flexible packing 16 to form a fluid-tight seal between the periphery of disc 14 and the inside of shell 10 when nuts 17 are tightened to draw disc 14 toward ring member 11. Such a closure arrangement is merely exemplary, and there are numerous types that could be used to seal the open end of shell 10.

Inlet conduit 18 and outlet conduit 19 for the reactant fluid materials extend through closure disc 14, and may be welded or otherwise secured thereto. These conduits communicate with the convoluted reaction tube bundle, in this case comprising suitable alloy tubes 1, 2, 3, 4, 5, 6, and 7, which lie with their longitudinal axes parallel to each other and to the axis of shell 10, and are connected in series by reduced diameter return bends 20, 21, 22, 23, 24, and 25. Spacer plates 26 and 27 are notched around their peripheries to engage the straight sections of bends 20–25 and maintain the tubes 1–7 of the bundle in unitary relation to each other and in parallel alignment within shell 10. Desirably, that spacer plate 26 adjacent the shell closure disc 14 is connected thereto with links 28 so that the tube bundle may be removed from shell 10 as a unit, together with closure disc 14.

A primary reason for the reduced diameter return bends is that of space conservation within shell 10, which, due to the usual high pressure therein, substantially approximating that of the reaction zone in the tubes, and also to maintain the heating fluid in liquid form, is desirably of as small diameter as possible. The radius of return bends 20–25 obviously can be smaller than those of the full diameter of tubes 1–7, which is determined by the hydraulic and heat transfer, as well as the reaction time considerations of the specific reaction process involved. The reduction in diameter at the outlet end of each of the main tubes 1–7, however, introduces an hydraulic situation in some reaction processes that may tend to lead to separation of the several fluid components traversing the reaction tubes. For example, in the present process, free ammonia gas may accumulate along the top of a tube and tend to be trapped therein by the reduction in diameter of the passage due to the smaller return bend at the end thereof. Also, the liquid components may tend to stratify according to their densities, for example, liquefied sulfur may accumulate in the lower part of the reaction tube, below the aqueous sulfate and sulfide solutions and the liquid organic material undergoing treatment.

Even if the main tubes and the return bends were all of a comparable diameter, the unavoidable necessity for some of the tubes to be at a higher level than the other would produce undesirable separations of the three components so that they would not progress together through the reaction zone but the heaviest would tend to remain behind in stagnant accumulations.

It has been found desirable, therefore, to provide adjacent to the outlet end of each one of tubes 1–7 a transverse baffle member 29, extending across the tube and providing restricted openings 30 and 31 which are, respectively, above and below the member 29. These have been found greatly to limit or to reduce the objectionable effects of the fluid separation and stratification just discussed. The spaces 30 and 31 are chosen to be small enough, for the hydraulic conditions encountered in a given multi-fluid system, so that sufficient hydraulic head builds up behind members 29 to depress liquids accumulated in the lower part of the large diameter straight sections 1–7 to force all of the liquid phases, stratified or not, through the lower space 31, and at the same time, accumulated gases above the liquid will be adequately cleared through the upper space 30 from the upper part of the section.

As mentioned above, certain reactions for which this apparatus and method are appropriate are endothermic and require the addition of heat. In this example, hot water or other appropriate liquid at about 650° F. and at 3400 p.s.i.g. has the necessary properties to add the heat required to sustain the desired reaction within tubes 1–7. The hot water inlet for shell 10 is illustrated in Figure 3, and consists of an elongated neck 32 for the closed end of shell 10, terminating in an appropriate inlet connection flange 33, which may be connected to a suitable water heater (not shown). With neck 32 is an inlet nozzle 34 which is spaced from and discharges hot water into a converging and diverging throat member 35 of approximate Venturi configuration. Throat 35 terminates in a conical member 36, spaced inwardly from the closed end of vessel 10.

Referring now to Figures 1 and 2, it will be noted that, secured to the inner face of shell 10 and between adjacent tubes 1–6 are means forming longitudinal conduit elements 37, 38, 39, 40, 41, 42 and 43, in this case consisting of metal angle sections with their legs welded to the shell throughout their length. At the righthand or water inlet end of shell 10, each of these conduit elements intersects and communicates with the rim of conical member 36 as at 44, the intervals of the member 36 between those points of intersection extending outwardly to be secured to the inside of shell 10. The opposite ends 45 of the several conduit elements are open to the space within shell 10 and are adapted to receive liquid from the space within the shell 10 and adjacent to its inner surface at the left hand end of the latter. A water outlet 46 for shell 10 is placed at some convenient location at the lefthand end, as shown.

From the preceding paragraphs it will be apparent that heating liquid entering shell 10 through inlet flange connection 33 will pass as a jet through nozzle 34 and across the open space to throat member 35, thus setting up a zone of reduced pressure that will communicate with the fluid outlet end of shell 10 by way of the annular space 47 outside of throat member 35 and the passages afforded by the several longitudinal conduit elements 35–43. This will cause a recirculation of part of the cooled heating liquid to return to the liquid inlet end of shell 10 to enter throat member 35 along with incoming hot liquid. If it is desired to modify the recirculation rate, nozzle 34 may be made adjustable, or replaceable by one of larger or smaller diameter. One result of this recirculation is a slight reduction in the average temperature of the heating liquid surrounding tubes 1–7, and a substantial and desirable increase can be effected in the velocity of flow of heating liquid around those tubes, which increases the heat transfer factor and gives a desirable overall control of the reactor operation. At very low overall heating liquid flow rates, such an arrangement effectively prevents the cooled liquid, with its resulting higher density, from accumulating in the lower part of shell 10, while the incoming hotter and less dense liquid rises to the upper part and leaves the shell without adequately contacting the reaction tubes.

In the exemplary installation under discussion, four reactor units are connected in series, both as to the several reacting materials undergoing treatment and as to the flow of the heating liquid. Into the tube bundle inlet 18 of the first reactor is fed the desired mixture of metaxylene and solutions of ammonium sulfate and ammonium sulfide at a temperature of 630° F. and a pressure of 3600 p.s.i.g. Due to the nature of the endothermic oxidizing reaction, about half of the conversion takes place in this first reactor, and, accordingly, about half of the total heat must be added by the heating liquid, which enters the inlet 33 of the first reactor shell 10 at about 690° F. The reaction proceeds successively more slowly in the following reactor units, so that the heating liquid, for the reasons outlined above, is required to add a correspondingly smaller amount of heat to the reactor tubes, to maintain the reacting materials at a uniform temperature of about 630° F. in the entire system. At higher temperatures, corrosion of the reactor tubes may become troublesome, and at lower temperatures, the oxidizing reaction may be undesirably slow. At the outlets of the last reactor, the heating liquid and the effluent fluids from the reaction zone are, respectively, about 635° F. and 630° F. With the system described herein, it is possible, without the use of separate heating liquid streams and high pressure external circulating pumps and conduits for the heating liquid, to maintain a constant or uniform overall flow rate through the four successive shells, and at the same time, to arrange the internal circulation rate in any one of the shells to obtain the desired high velocity of flow around the tube bundle to give the required control of heat transfer rate in that reactor.

The unusual conditions of operation imposed by the reaction described above, viz., the controlled partial oxidation of organic materials and, specifically, hydrocarbons with water-soluble sulfides and sulfates at temperatures of 200°–700° F. and pressures of 200 up to 5000 p.s.i.g., created new problems in the mode of operation and the materials of construction, as well as the structural features of the reactor structure. It was found, for example, that the usual American Iron and Steel Institute Type 316 stainless steel alloy (ASTM D–296) of the ELC (extra low carbon) type having a carbon content less than about 0.03%, had the necessary corrosion resistant properties, but lacked the high yield strength needed to withstand expected stresses at the operating temperatures. Normally, there would be only a nominal pressure differential between the interior and exterior of the reactor tube bundle, but in event of partial or entire loss of pressure in shell 10, it is essential that the tube system should have adequate strength to withstand such an occurrence without failure.

Accordingly, a new alloy composition was developed, together with a heat treatment therefor, that gives the necessary corrosion resistance as well as the high strength properties for this reactor tube system, as well as other environments of a comparable nature. The range of analysis of the preferred composition is as follows:

| Element: | Range, percent |
|---|---|
| Carbon | 0.03 max. |
| Chromium | 16.0–18.5 |
| Nickel | 10.0–14.0 |
| Molybdenum | 2.0–3.0 |
| Manganese | 0.50–1.00 |
| Silicon | 0.35–0.75 |
| Phosphorus | 0.040 max. |
| Sulfur | 0.040 max. |
| Niobium (columbium) | 0.20–0.30 |
| Remainder substantially all iron. | |

The chromium and nickel ranges are probably unduly restrictive and, to facilitate production, could be extended several percent in either direction. However, to obtain adequate impact strength, it is desirable to balance the chromium and nickel proportions so that the ultimate ferrite content will be within the range of about 3 to 8%. The following example illustrates a preferred composition of material that meets the requirements of this invention:

| Element: | Percent |
|---|---|
| Carbon | 0.024 |
| Chromium | 18.05 |
| Nickel | 12.48 |
| Molybdenum | 2.60 |
| Manganese | 0.84 |
| Silicon | 0.63 |
| Phosphorus | 0.011 |
| Sulfur | 0.012 |
| Niobium (columbium) | 0.27 |
| Remainder substantially all iron. | |

The essential proportions are considered to be those of the low carbon content, less than about 0.03%, and the niobium (columbium) content of 0.20 to 0.30%, which is substantially ten times the carbon content. The material may be centrifugally or otherwise cast into suitable lengths, which may be welded to form the straight and curved tubes of the bundle. Prior to welding they should be heat treated to transform the normally ductile ferrite present to the harder and stronger sigma phase. A suitable heat treatment has been found to be from at least 2 hours up to about 4 hours at 2100°–2200° F., followed by a water quench, after which the material is held at 1500°–1600° F. (desirably at 1550° F.) for at least 3 and desirably from about 5–8 hours, and then cooled in still air. This apparently results in a desirable amount of precipitation hardening to develop the high yield strength.

These specifications will result in a material having desirable impact properties, as well as a yield strength at 700° F. of 24,000 to 29,000 pounds per square inch, which has not hitherto been attained in an alloy of this type. The presence of the alloy has no adverse effects upon this specific reaction, its corrosion rate is acceptable for prolonged operation, and obviously it could be used in other circumstances, where its desirable high yield strength at high temperatures is required or is of advantage, in addition to its corrosion resistance.

In conclusion, it will be appreciated that this invention comprehends broadly an improved reactor material, as well as a reactor structure and mode of operation, for carrying out the hydrocarbon oxidation reaction described. The reactor alloy material and the hydrocarbon oxidation reaction procedure are disclosed and claimed in our copending application Serial No. 656,416, filed May 1, 1957. Although a specific example of the equipment and the methods employed therein has been illustrated and described, it is apparent that numerous modifications and changes could be made without departing from the essential features of the invention, and all such alterations that fall within the scope of the appended claims are intended to be embraced thereby.

We claim:

1. A heat exchanger comprising a cylindrical shell provided with an end closure, a convoluted tube bundle to provide a confined passage extending into and out of said shell from said closure end, to convey fluids out of contact with the interior of said shell, a liquid outlet for said shell adjacent to said closure end, a liquid inlet for the opposite end of said shell, means secured to the interior of said shell forming a plurality of liquid-conveying passages adjacent to the inner wall of said shell and extending from a point near said outlet toward the inlet end of said shell, and jet eductor means at said liquid inlet connected to said passages for receiving liquid therefrom and mixing it with liquid entering said inlet to said shell.

2. A reactor comprising an elongated horizontal cylindrical shell, a conduit for simultaneously conveying a mixture of liquid and gaseous fluids, said conduit extending into and out of said shell at one end thereof, said conduit including a succession of elongated, parallel, horizontal straight portions of large diameter connected at their ends to return conduit bends of smaller diameter by substantially conical transition elements, a transverse, horizontal, fluids-mixing baffle in the outlet of each of said large diameter conduit portions, said baffle extending entirely across said last named conduit portion and providing a restricted passage for gaseous fluid above its upper edge and providing a restricted passage for liquids below its lower edge, thereby to promote mixing and prevent stratification of said gas and said liquids in said larger diameter portions of said horizontal conduit.

References Cited in the file of this patent

UNITED STATES PATENTS

| 662,296 | Palmer | Nov. 20, 1900 |
| 1,517,526 | Barnebey | Dec. 2, 1924 |
| 1,545,209 | Steckel | July 7, 1925 |
| 1,652,188 | Vennum | Dec. 13, 1927 |
| 1,731,223 | Brady | Oct. 8, 1929 |
| 1,749,654 | Wyndham et al. | Mar. 4, 1930 |
| 1,760,376 | Stablein | May 27, 1930 |
| 1,803,480 | Merica et al. | May 5, 1931 |
| 1,866,717 | Meyer et al. | July 12, 1932 |
| 1,967,235 | Ferkel | July 24, 1934 |
| 2,009,910 | Touborg et al. | July 30, 1935 |
| 2,235,644 | Richardson | Mar. 18, 1941 |
| 2,610,109 | Adams et al. | Sept. 9, 1952 |
| 2,710,878 | Glasebrook | June 14, 1955 |
| 2,767,233 | Mullen et al. | Oct. 16, 1956 |